July 27, 1965   J. A. MAYNARD   3,197,756
DISPLACEMENT SENSING APPARATUS
Filed Dec. 27, 1960   2 Sheets-Sheet 1
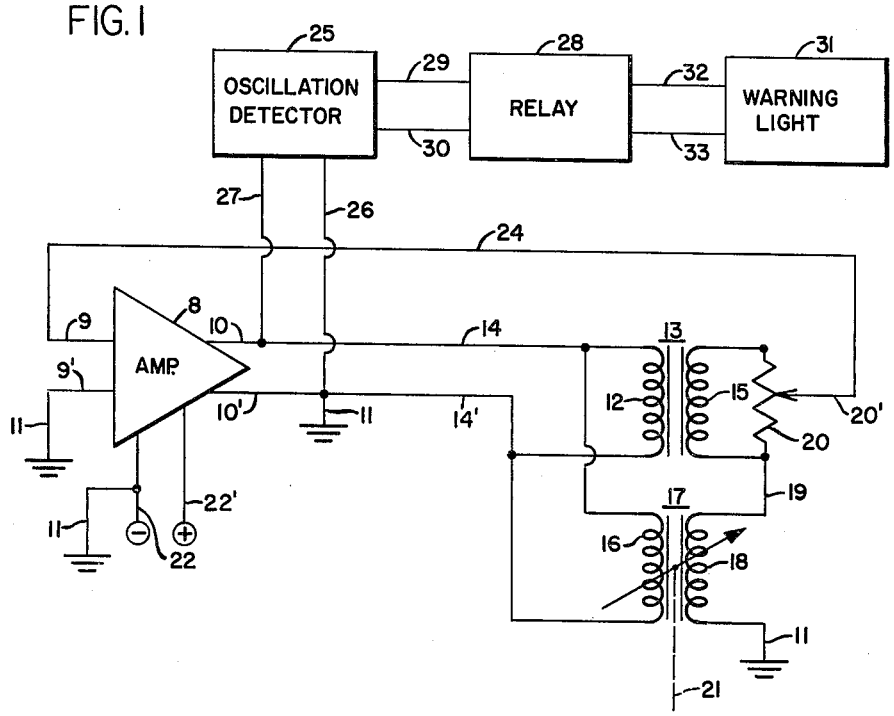
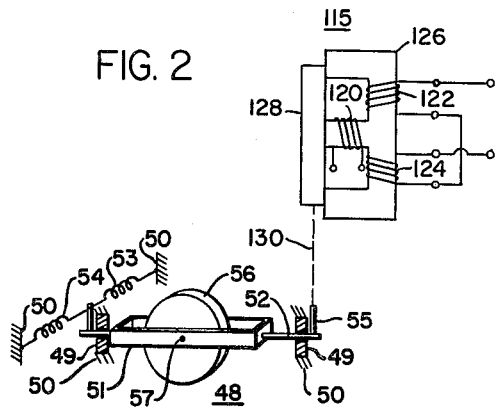
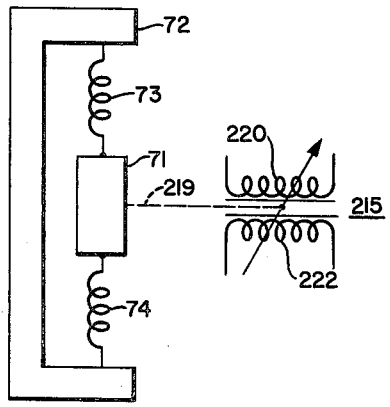
INVENTOR.
JOHN A. MAYNARD
BY Roger W. Jensen
ATTORNEY

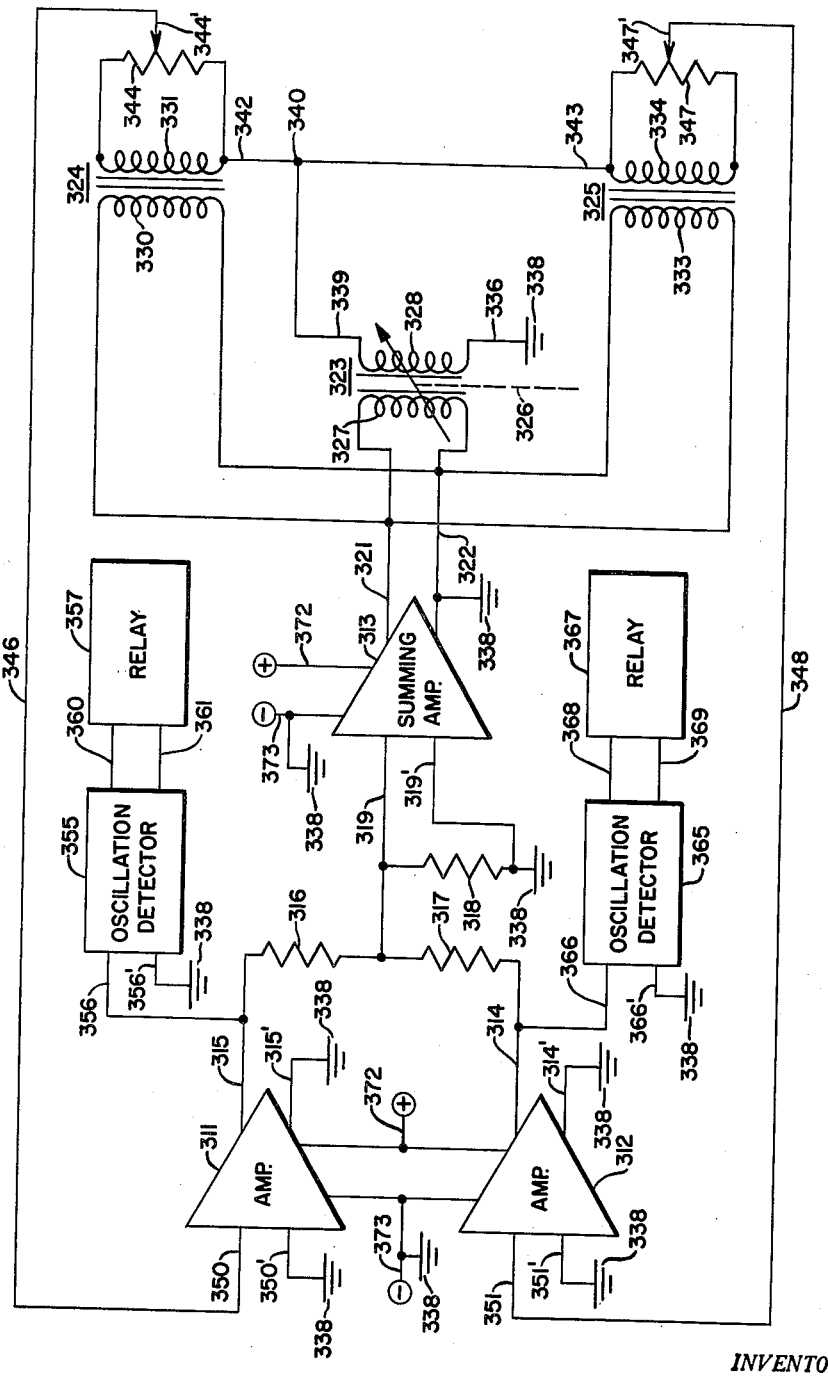

United States Patent Office 3,197,756
Patented July 27, 1965

3,197,756
DISPLACEMENT SENSING APPARATUS
John A. Maynard, Winchester, Mass., assignor to Honeywell Inc., a corporation of Delaware
Filed Dec. 27, 1960, Ser. No. 78,739
7 Claims. (Cl. 340—262)

This invention relates to a switching system and more particularly to a switching system of the type wherein a switching action is obtained as a function of a control means being controlled to or beyond the predetermined point. One specific application of the present invention is in the field of rate measuring instruments such as rate gyros and accelerometers, the invention providing a warning system wherein a signal or warning is given when the turn rate of a gyro or the acceleration sensed by an accelerometer becomes greater than a predetermined amount. The warning signal can be produced for only one sense of movement of the sensing device or, in another embodiment, can be produced for both senses of movement of the sensing device. For example, the invention may provide an output only when an input turning rate equal to or greater than a predetermined amount of one sense is applied to a rate gyro. Alternately, the output can be produced when the predetermined rate (of either sense) is applied to the rate gyro.

In one application of the present invention, the output terminals of an amplifier are connected to the primaries of both a pickoff and a reference transformer. The secondaries of the two transformers are connected in series and utilized to provide feedback to an input of the amplifier. The magnitude and phase of the coupling between the primary and the secondary is a function of the position of the armature used in the pickoff. This coupling can be varied through 180° in phase and is used in combination with the reference transformer to supply either positive or negative feedback to the amplifier. With positive feedback, the amplifier oscillates and causes a relay to be energized when the inductive pickoff coupling is greater than the reference transformer coupling; whereas, with negative feedback, the circuit is stable and the relay will remain deenergized. Since the function of the amplifier is to oscillate when positive feedback is applied, the stability requirements of the amplifier and the voltage supply are not as critical as in prior art applications.

One prior art method of accomplishing the switching action is the procedure of amplifying a pickoff voltage, rectifying it, comparing this output to a reference signal and supplying the resultant combined reference and pickoff signal to operate a relay. To insure reliable operation and good repeatability in a system such as this under present tube parameters and ambient condition variations, it is necessary to provide an extremely stable amplifier and stable reference voltage. This demands complex circuitry and results in an increase in both size and cost over the present invention.

General and specific objects of this invention will become apparent from a reading of the following specification and appended claims, and in conjunction with the accompanying drawings of which:

FIGURE 1 is a block circuit diagram showing a first embodiment of the invention where an indication is obtained when the member being monitored is moved in one direction;

FIGURE 2 is a simplified representation of a rate gyro connected to an inductive pickoff;

FIGURE 3 is a simplified representation of a accelerometer connected to an inductive pickoff; and FIGURE 4 is a block circuit diagram of another embodiment of the invention in which two separate indications are given when the member being monitored is moved more than individually predetermined amounts in one direction or the other.

In FIGURE 1 an amplifier 8 is shown with input leads 9 and 9' and output leads 10 and 10'. Leads 9' and 10' are connected to ground leads 11. A primary winding 12 of a reference transformer 13 is connected to the output of amplifier 8 by wires 14 and 14'. The transformer 13 also has a secondary winding 15. The wires 14 and 14' also connect the output leads of amplifier 8 to a primary winding 16 of an inductive pickoff 17 which has a secondary winding designated as 18. One end of the secondary winding 18 of the inductive pickoff 17 is connected to ground 11, while another end of the secondary winding 18 is connected to one end of the secondary winding 15 of reference transformer 13 by a wire 19. A potentiometer 20 is connected directly across winding 15. a wiper 20' on potentiometer 20 is connected to the input 9 of amplifier 8 by a wire 24. A control arm or member 21 is used to vary the coupling of inductive pickoff 17 in a manner described later. Power is supplied to the amplifier 8 through a positive lead 22' and a negative lead 22. Lead 22 is also connected to ground 11 although it is to be understood, lead 22' could be connected to ground 11 instead.

In a preferred embodiment of this invention, an oscillation detector 25 is connected to the output leads 10' and 10 of the amplifier 8 by wires 26 and 27. If the output of the amplifier 8 is sufficient, the oscillation detector 25 can be a simple device such as a rectifier, using the oscillatory signals from the amplifier 8 to provide a D.C. output signal. If, however, the output of amplifier 8 is adapted to provide only low power outputs, a rectifier and an amplifier can be used as the oscillation detector in the manner shown in the Reek Patent 2,770,734. A relay or switching means 28 is connected to an output of the oscillation detector 25 by wires 29 and 30. Means to be controlled, such as a warning device or warning light 31 is connected to an output of the relay 28 by wires 32 and 33. It will be understood that the oscillation detector 25 and the relay 28 may not be required in every embodiment of this invention. If the output signal of the amplifier 8 is sufficient, the oscillatory signal may be applied directly to a warning device such as a light or a relay to give a warning indication with no rectification or amplification required. The relay can be used to shut off equipment of some type and is not limited to turning a light on and off.

FIGURE 2 depicts a simplified rate gyroscope 48 having a base means 50. A suitable bearing means 49 supported by base means 50 allows rotation of a gimbal 51 about its output axis 52. The gimbal 51 is held in a normal position by resilient means 53 and 54 which are attached to base means 50. A gyro rotor 56 is adapted to rotate about a spin axis 57 which is perpendicular to the axis of rotation or output axis 52 of the gimbal 51. A control member 55 connected to gimbal 51 is attached to an inductive pickoff 115 which has a primary winding 120 and secondary windings 122 and 124. Transformer 115 has an E shaped core 126 and a movable straight core 128 which is positioned adjacent the legs of the core 126. Core 128 is attached to pickoff 48 by a mechanical connection shown as 130.

When the rate gyroscope shown in FIGURE 2 is in operation, the rotor 56 is rotating at a given speed and the gimbal is held in a null or normal position by the resilient restraining means 53 and 54. When the base 50, upon which the gimbal is mounted, is rotated about an axis which is perpendicular to both the spin axis and the output axis, the gimbal 51 precesses or rotates about the output axis 52 in a direction and in an amount proportional to the rate of rotation of the base 50. When rotation of the base 50 ceases, the gimbal 51 returns to its normal position and the output of pickoff 115 decreases to a null or minimum voltage. The pickoff 115 is designed so that when the gimbal 51 is in its null or normal position there will be a null in the signal output of the pickoff. The function of the pickoff is to produce an output signal the sense and magnitude of which varies according to the sense and magnitude respectively of the applied input to the gyro. With the inductive pickoff specifically shown, the phase and magnitude of the output signal varies according to the sense and magnitude respectively of the applied input turning rate to the gyro. The magnetic flux through the legs of core 126 will divide evenly so that the same amount of flux affects winding 122 as affects winding 124. The windings 122 and 124 are wound so that with equal amounts of magnetic flux affecting them, their result and output will be a minimum or substantially zero amount. If the flux distribution through the windings is uneven, there will be an output of a phase and magnitude depending upon which winding has the most flux flowing therethrough and the magnitude of this flux with respect to the flux flowing through the other winding. The uneven distribution of the magnetic flux is accomplished by movement of core 128 in response to movements of pickoff 48. As the core 128 is moved in the upward direction, the lower leg of core 126 will have a smaller magnetic path and therefore there will be more restriction on the magnetic flux flow therethrough while the upper leg will have a larger magnetic path and therefore there will be less restriction so as to allow more magnetic flux to flow through the upper leg and accordingly through winding 122. As can be seen, if an output is taken with respect to the lower terminal of winding 124, the upper terminal of winding 122 will vary both in phase and in magnitude with respect to the first mentioned terminal with movements of core 128. It will be understood that when the input to the gyro is removed then the resilient means 53 and 54 will return the gimbal to its normal null signal producing position.

While an inductive pickoff 115 has been shown, it will be understood that other pickoffs may be used within the teaching of the invention.

FIGURE 3 depicts a simplified accelerometer 70. A seismic mass or a member 71 mounted for movement is attached to a base means or base member 72 by resilient mounting means 73 and 74. The seismic mass 71 is attached to an inductive pickoff 215 by a control means 219. The inductive pickoff 215 has a primary winding 220 and a secondary winding 222 and can be considered as basically the same inductive pickoff as shown in FIGURE 2 as 115.

Reference to FIGURE 3, in conjunction with the following description, will aid in understanding the operation of an accelerometer. When the base means 72 is given an acceleration, the seismic mass 71 moves to a position other than the normal position and in a direction opposite the direction of acceleration. The mechanical linkage 219 to the inductive pickoff 215 varies the output voltage of the inductive pickoff 215 upon any movement of the seismic mass 71. As can be seen, the springs or restraining means 73 and 74 tend to hold the seismic mass 71 in a normal position and still allow an output indication. Variation of the output voltage of the pickoff 215 is produced, by movement of the seismic mass 71, upon acceleration of the base means 72 in either of two oppositely opposed directions in line with the direction of movement of the seismic mass. The voltage output from secondary winding 222 of inductive pickoff 215 varies in phase and magnitude as the seismic mass 71 changes in position from one side of the normal position to the other side as long as the voltage applied to the primary winding 220 remains constant. The sense and magnitude of this output voltage from secondary winding 222 is indicative of the sense and magnitude of movement of the seismic mass 71.

In FIGURE 4 an amplifier 311 is shown with input leads 350 and 350' and with output leads 315 and 315' connected to inputs 319 and 319' of a summing amplifier 313 through a resistor 316 and ground 338. A second amplifier 312 is also shown with input leads 351 and 351' and with output leads 314 and 314' also connected to input leads 319 and 319' of the summing amplifier 313 through a summing resistor 317 and ground 338. Leads 350, 315', 351', 314', and 319' are all connected to ground lead 338. A resistor 318 is connected across the input leads 319 and 319' of summing amplifier 313. The three resistors 316, 317, and 318 form a summing circuit for the outputs of amplifiers 311 and 312. In certain applications, the summing amplifier 313 would not be required and the invention could operate with just the summing circuits 316, 317, and 318. A primary winding 327 of an inductive pickoff 323 is connected to an output of the summing amplifier 313 by output wires 321 and 322. Output lead 322 is connected to ground 338. A primary winding 330 of a bias or reference transformer 324 is also connected to the output of summing amplifier 313 by wires 321 and 322. The wires 321 and 322 are also connected to a primary winding 333 of a second reference transformer or biasing means 325. The variable energy transferring means or inductive pickoff 323 has a secondary winding 328 which is connected at one end 336 to ground 338 and at the other end 339 to a junction point 340. The output of inductive pickoff 323 is varied by moving a control member 326 while an input signal is applied to winding 327. A secondary winding 331 of the reference transformer 324 and a secondary winding 334 of the reference transformer 325 each have one end thereof connected to the junction point 340 by leads 342 and 343 respectively. A potentiometer 344 is connected directly across the secondary winding 331. A wiper 344' of potentiometer 344 is connected to the input 350 of the amplifier 311 by a wire 346. A potentiometer 347 is connected directly across the secondary winding 334. A wiper 347' of potentiometer 347 is connected to the input 351 of amplifier 312 by a wire 348. An input lead 356 of an oscillation detector 355 is connected to the output 315 of the amplifier 311. Another input lead 356' of the oscillation detector 355 is connected to ground 338. A warning means or specifically in this case a relay 357 is connected to an output of oscillation detector 355 by wires 360 and 361. An input lead 366 of an oscillation detector 365 is connected to the output lead 314 of the amplifier 312. As with oscillation detector 355 another input lead 366' of oscillation detector 365 is connected to ground 338. A second warning means or relay 367 is connected to an output of oscillation detector 365 by wires 368 and 369. Power is supplied to amplifiers 311, 312, and 313 from a positive terminal 372 and a negative terminal 373. Terminal 373 is connected to ground 338. It is to be understood, however, that if desired, terminal 372 could be connected to ground instead of terminal 373. The comments pertaining to the need of oscillation detector 25 and relay 28 of FIGURE 1 also pertain to oscillation detectors 355 and 365 and to the warning means 357 and 367.

*Operation*

The inductive pickoff 17 in FIGURE 1 operates in the same fashion as previously described in FIGURES 2 and 3 in that, when a voltage is applied to the primary winding 16 and the mechanical control 21 to the pickoff 17 is changed in position, the output voltage from secondary winding 18 is changed proportionately in sense and magnitude from a minimum amplitude or null position as the control member 21 is changed in sense and magnitude from the normal position. The primaries of reference transformer 13 and inductive pickoff 17 are connected to the outputs 10 and 10' of amplifier 8 in a manner to give negative feedback to the input 9 of amplifier 8 when the control member 21 is in a normal position. The application of negative feedback to the amplifier 8 produces a stable condition and no further action is obtained. When the control member 21 is moved from the normal position, the coupling between the amplifier output and amplifier input changes an amount which is indicative of the direction and magnitude of change of control member 21. If the coupling from secondary winding 18 is in phase with the coupling from secondary winding 15, the two couplings add and together supply negative feedback to the input 9 of amplifier 8. If however, the coupling of secondary winding 18 is out of phase with respect to the coupling of secondary winding 15 because the control member 21 is moved in the opposite direction from normal, the coupling produced by the two secondary windings will subtract from each other and when the coupling of secondary winding 18 becomes greater in magnitude than the coupling of secondary winding 15, positive feedback will be applied to the input 9 of amplifier 8. When the coupling is negative, that is in a position such that negative feedback is applied, there are small voltages in the primaries 12 and 16 of the reference transformer 13 and the pickoff 17. This is commonly referred to as noise voltage and is produced by pickup in the wires and is also generated in the tubes or transistors used in the amplifier 8. This noise voltage is adequate to produce oscillation in the amplifier 8 when fed back to the input 9 in a positive sense. The noise voltage is not, however, great enough in magnitude to trip the relay. When positive feedback is applied to an amplifier such as amplifier 8, the feedback is termed positive or regenerative and produces oscillations. The amplitude of the oscillation voltage appearing at the amplifier output 10 and 10′ will be large and essentially independent of the magnitude of the positive feedback coupling. These oscillations will continue as long as the control member 21 is in a position to produce more in phase coupling on the pickoff winding 18 than the coupling produced by reference transformer 13 on secondary winding 15. When the oscillation detector 25 senses oscillatory signals being produced by the amplifier 8, an output signal is produced to switch the relay 28 and either give a warning signal or turn on a warning light as indicated by the block 31. The potentiometer 20 is used to compensate for inherent variations between individual transformers, to give a very precise setting of the point of warning, and to give a means for changing this setting. If high accuracy is not required, the potentiometer 20 is not needed and the wire 24 could be connected directly to the upper end of secondary winding 15.

Since the circuit of FIGURE 1 will give negative feedback when motion is applied in one direction to the control member 21 and give positive feedback after a predetermined amount of movement in the other direction this means that an output signal will be produced only upon one direction of rotation or on one direction of acceleration using the rate gyro in FIGURE 2 or the accelerometer shown in FIGURE 3. If an output signal indication is desired in both of two directions of movement, the system shown in FIGURE 4 can be used.

In FIGURE 4 the reference transformers 324 and 325 give negative feedback coupling to amplifiers 311 and 312 respectively when the inductive pickoff is in a nominal state. When a monitored condition changes to cause a change in the coupling of the inductive pickoff 323, this change in coupling becomes apparent at a junction point 340. This coupling is in phase with one reference transformer and out of phase with the other reference transformer. Let it be arbitrarily assumed that the coupling of the pickoff 323 is in phase with the coupling of reference transformer 324. This will produce more negative feedback to the amplifier 311 and preclude the possibility of oscillations. On the other hand, the coupling produced by the inductive pickoff 323 will subtract from the coupling of transformer 325 to give positive feedback when the condition being monitored becomes great enough to change the coupling of the inductive pickoff 323 more than a predetermined amount. The same comments made about noise voltage in reference to FIGURE 1 apply to FIGURE 4. When positive feedback is then applied to the amplifier 312, it oscillates and the oscillatory signal is carried through the summing resistors 317 and 318 to the input of the summing amplifier 313 to keep one side of the circuit oscillating. Since there is ample negative feedback around the other side of the circuit, this other side will not oscillate. The oscillation of amplifier 312 will be detected by the oscillation detector 365 and will produce an output to operate a relay or some other device as shown in the box 367. Again, potentiometers 347 and 344 are not required, but if they are used as shown in FIGURE 4, the transformers 324 and 325 do not need to be held to such tight specifications and the warning points can be readjusted easily.

If the control member 326, connected to the inductive pickoff 323, is varied in the opposite direction, the coupling of pickoff 323 will add to the coupling of the reference transformer 325 and produce negative feedback to amplifier 312 to prevent oscillation in this direction and will subtract from the coupling produced by reference transformer 324 to cause the amplifier 311 to oscillate at a given point. The two amplifiers 311 and 312 can be adapted to oscillate at different frequencies to prevent any tendency of one amplifier to oscillate when the other amplifier is oscillating in spite of the negative feedback that is applied.

While I have shown and described two embodiments of this invention, further modifications and improvements will occur to those skilled in the art. I desire it to be understood, therefore, that this invention is not limited to the particular form shown and described and I intend in the appended claims to cover all modifications which do not depart from the spirit and scope of this invention.

What I claim is:

1. In an inertial switching means: an inertial instrument having a control member mounted for movement with respect to an axis; inductive pickoff means including primary and secondary windings, said inductive pickoff means being attached to said control member to give an output, when a signal is applied to said primary winding, of a sense and magnitude indicative of the sense and magnitude of the displacement of said control member; an amplifier including input and output terminals, said amplifier providing an oscillatory signal at said output terminals when positive feedback is applied to said input terminals; a transformer means including primary and secondary means; means connecting said primaries of said inductive pickoff and said transformer means to said amplifier output terminals; and means connecting said secondaries of said inductive pickoff and said transformer means to said amplifier input for providing a feedback signal thereto.

2. In a switching system:
   member means mounted for movement;
   variable energy transferring means including input and output means, the varying portion of said variable energy transferring means being attached to said member means to vary in accordance therewith, said variable energy transferring means having a null position at which a minimum amplitude output signal appears at said output means;
   biasing means, including input and output means, for providing an output signal of an amplitude equal to that provided by said variable energy transferring means when said member means is moved a selected distance from the position at which the null condition is obtained in said variable energy transferring means;

amplifier means, including input and output means, said amplifier means oscillating when a positive feedback signal is applied to said input means of said amplifier means;

oscillation detecting means, including input means, for providing a warning when an oscillatory signal is applied to said input means thereof;

means connecting said output means of said amplifier means to said input means of said biasing means, of said variable energy transferring, and of said oscillation detecting means;

and means connecting said output means of said biasing means and of said variable energy transferring means together and to said input means of said amplifier means for providing positive feedback to said amplifier means when said member means is moved beyond the selected distance from the null position.

3. In an accelerometer switching means: a base; a control member movably attached to said base; means resiliently restraining said control member to a normal position but allowing movement proportional to the magnitude of an acceleration component applied to said base; inductive pickoff means including primary and secondary windings, said inductive pickoff means being attached to said control member for providing an output signal, when a signal is applied to said primary winding, of sense and magnitude indicative of the sense and magnitude of the displacement of said control member; an amplifier including input and output terminals, said amplifier providing an oscillatory signal at said output terminals when positive feedback is applied to said input terminals; a relay; an oscillation detector including input and output terminals, said oscillation detector being connected to said relay and operating said relay when an oscillatory signal is applied to said input of said oscillation detector; means connecting said amplifier, said oscillation detector and said relay together to operate said relay when said amplifier oscillates; reference transformer means including primary and secondary winding means; means connecting said primaries of said inductive pickoff and said reference transformer to said amplifier output terminals; and means connecting said secondaries of said inductive pickoff and said reference transformer to said amplifier input, said amplifier thereby producing oscillations when a positive feedback signal is applied to said input terminals of said amplifier.

4. In a switching system for a rate gyro; an amplifier including input and output terminals, said amplifier oscillating upon an application of positive feedback to said input terminal; a warning means; an oscillation detector including input and output terminals, said oscillation detector providing output sufficient to operate said warning means upon the application of an oscillatory signal to said input of said oscillation detector; means connecting said amplifier output terminals, said oscillation detector input and output terminals, and said warning means to operate said warning means when said amplifier oscillates; a base means; a gimbal rotatably mounted on said base for rotation about an output axis; means resiliently restraining said gimbal to a normal position; a gyro rotor on said gimbal rotating about a spin axis perpendicular to said output axis; an inductive pickoff means including primary and secondary windings and a member connected to said gimbal for providing an output, when a signal is applied to said primary winding, from said secondary winding which has a phase and magnitude indicative of the sense and magnitude of gimbal movement away from said normal position of said gimbal; a reference transformer including primary and secondary windings; means connecting said primaries of said reference transformer and said inductive pickoff in parallel and to said output of said amplifier; and means connecting said secondaries of said reference transformer and said inductive pickoff in series and to an input of said amplifier.

5. In a switching system for a rate gyro; an amplifier including input and output terminals, said amplifier oscillating upon the application of positive feedback to said input terminal; a relay; an oscillation detector including input and output terminals, said oscillation detector providing an output sufficient to operate said relay upon the application of an oscillatory signal to said input of said oscillation detector; means connecting said amplifier, said oscillation detector, and said relay, for producing an operation of said relay when said amplifier oscillates; a base means; a gimbal rotatably mounted on said base for rotation about an output axis; means resiliently restraining said gimbal to a normal position; a gyro rotor on said gimbal rotating about a spin axis perpendicular to said output axis; an inductive pickoff means including primary and secondary windings, said inductive pickoff means being connected to said gimbal, said pickoff means producing an output signal from said secondary winding, when a signal is applied to said primary winding, which has a phase and magnitude indicative of the sense and magnitude of gimbal movement away from said normal position of said gimbal; a reference transformer including primary and secondary windings; means connecting said primaries of said reference transformer and said inductive pickoff to said output of said amplifier; and means connecting said secondaries of said reference transformer and said inductive pickoff in series and to said input of said amplifier, said reference transformer supplying a bias voltage which is additive to said pickoff voltage in one sense of movement of said gimbal and subtractive from said pickoff voltage in the other sense of movement of said gimbal, the combination of said voltages supplying negative feedback when said voltages are additive and positive feedback when said pickoff voltage is greater in magnitude than said reference transformer voltage and subtractive from it in phase.

6. In a switching system for a movable mass: a first amplifier including input and output terminals, said amplifier oscillating upon the application of a positive feedback signal at said input; a first relay; means connecting said first amplifier to said first relay, said first relay operating when said first amplifier oscillates; a second amplifier including input and output terminals, said second amplifier oscillating upon the application of a positive feedback signal; a second relay; means connecting said second amplifier to said second relay, said second relay operating when said second amplifier oscillates; a base means; a mass attached to said base means and mounted for movement; means resiliently restraining said mass to a normal position; a variable energy transferring means, including input and output terminals; a member attached to said movable mass and to said variable energy transferring means, said variable energy transferring means producing an output signal, when a signal is applied to said input terminals of said transferring means, which has a sense and magnitude indicative of the sense and magnitude of mass movement away from said normal position of said mass; a summing means including input and output terminals; means connecting said output of said first and of said second amplifiers to said input of said summing means in a summed relationship; means connecting said variable energy transferring means to said output of said summing means; means connecting said output of said variable energy transferring means to said amplifier inputs, a negative feedback signal being applied to said first amplifier input when said mass is moved in a first sense and a positive feedback signal being applied to said second amplifier input when said mass is moved beyond a predetermined point in said first sense and a positive feedback signal being applied to said first amplifier input when said mass is moved beyond a predetermined point in a second sense and a negative feedback signal being applied to said second amplifier when said mass is moved in said second sense.

7. In a switching system for a monitored mass: a first oscillating means including input and output terminals, said first oscillating means oscillating upon the application of positive feedback and providing an output sufficient to operate a first warning device; a second oscillating means including input and output terminals, said second oscillating means oscillating upon the application of positive feedback and providing an output sufficient to operate a second warning device; a base means; a mass to be monitored mounted on said base means; means resiliently restraining said mass to a normal position; an inductive pickoff means including primary and secondary windings, said inductive pickoff means being attached to said mass, said pickoff producing an output, when a signal is applied to said primary windings, from said secondary winding which has a phase and magnitude indicative of the sense and magnitude of mass movement away from said normal position of said mass; a summing means including input and output terminals; means connecting said output of each of said first and said second oscillating means to said input of said summing means; first and second biasing means; means connecting said first and second biasing means and said inductive pickoff to said output of said summing means; means connecting said first biasing means and said inductive pickoff secondary to said input of said first oscillating means, said first biasing means supplying a bias voltage which is additive to said pickoff voltage in a first sense of movement of said mass and subtractive from said pickoff voltage in a second sense of movement of said mass, the combination of said voltages supplying negative feedback to said first oscillating means when said voltages are additive and supplying a positive feedback signal when said pickoff voltage is greater in magnitude than said first biasing means voltage and subtractive from it in phase; and means connecting said second biasing means and said inductive pickoff secondary to said input of said second oscillating means, said second biasing means supplying a bias voltage which is additive to said pickoff voltage in said second sense of movement of said mass and subtractive from said pickoff voltage in said first sense of movement of said mass, the combination of said voltages supplying negative feedback to said second oscillating means when said voltages are additive and supplying positive feedback when said pickoff voltage is greater in magnitude than said second biasing means voltage and subtractive from it in phase.

References Cited by the Examiner
UNITED STATES PATENTS

| | | | |
|---|---|---|---|
| 2,437,661 | 3/48 | Coake | 340—187 |
| 2,439,711 | 4/48 | Bovey | 340—196 |
| 2,494,579 | 1/50 | Pimlott et al. | 340—196 |
| 2,503,851 | 4/50 | Snow | 340—196 |
| 2,505,577 | 4/50 | Rich | 331—65 |
| 2,508,370 | 5/50 | Bojoian | 340—196 |
| 2,511,819 | 6/50 | Wannamaker | 331—65 |
| 2,602,239 | 7/52 | Wrigley | 33—204.1 |
| 2,669,126 | 2/54 | Simmons | 340—196 |
| 2,918,666 | 12/59 | Brower et al. | 331—65 |
| 2,959,965 | 11/60 | Holmes | 73—517 |
| 3,037,165 | 5/62 | Kerr | 340—258 |
| 3,042,908 | 7/62 | Pearson | 331—65 |

NEIL C. READ, *Primary Examiner.*

ELI J. SAX, *Examiner.*